(12) United States Patent
Iura et al.

(10) Patent No.: US 6,612,761 B2
(45) Date of Patent: Sep. 2, 2003

(54) ELECTRONIC APPARATUS

(75) Inventors: Katsutoshi Iura, Nagoya (JP); Yuichiro Suzuki, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 132 days.

(21) Appl. No.: 09/805,030

(22) Filed: Mar. 14, 2001

(65) Prior Publication Data

US 2001/0022914 A1 Sep. 20, 2001

(30) Foreign Application Priority Data

Mar. 16, 2000 (JP) ........................................ 2000-079251

(51) Int. Cl.$^7$ ................................................ B41J 5/28
(52) U.S. Cl. ........................ 400/480; 400/473; 400/477
(58) Field of Search ................................. 400/480, 261, 400/414, 473, 476, 477, 489

(56) References Cited

U.S. PATENT DOCUMENTS 3,760,409 A * 9/1973 Ruben et al. .................. 341/24
6,491,457 B2 * 12/2002 Ahmed ........................ 400/477

* cited by examiner

Primary Examiner—Lamson Nguyen
(74) Attorney, Agent, or Firm—Oliff & Berridge, PLC.

(57) ABSTRACT

In an electronic apparatus, a pressing of keys other than a print key is detected when the key is continuously in a pressed state for at least two periods in a key scan period. The pressing of the print key is detected when the print key is continuously in the pressed state for at least ten periods in the key scan period. This structure prevents the print key from triggering a print operation if it is accidentally pressed.

22 Claims, 5 Drawing Sheets

ELECTRONIC APPARATUS

BACKGROUND OF THE INVENTION

1. Field of the Invention

The invention relates to an electronic apparatus that has a plurality of keys arranged thereon, and that can prevent an undesired operation from occurring due to a specific key being accidentally pressed.

2. Description of the Related Art

Electronic apparatuses exist that have a plurality of keys arranged on a front of their housing. For example, word processors, cellular phones, mobile computers, PDAs (Personal Digital Assistants), tape writers, have such an arrangement and can print desired characters and symbols on a printing medium, such as on a length of tape, etc.

The tape writer is described as an example of such a device. The tape writer is provided with a liquid crystal display for displaying the contents to be printed, and a plurality of keys, such as a power key for turning power of tape writer on/off, character input keys for inputting desired characters by an user, a tape feed key, a tape take-up key, and a print key for starting printing on tape.

When printing is performed on the tape using such a tape writer, the user turns the power of the tape writer on by pressing the power key. After that, the user inputs desired characters and the like by pressing the character input keys and then pressing the print key after confirming that the desired characters are displayed on the liquid crystal display. By doing so, the desired characters are printed on the tape. The printed tape is automatically cut by a cutter or cut by a cutting operation by the user.

A handheld tape writer that has a relatively small housing is an example of such a tape writer. The user can easily carry the handheld tape writer, and can obtain a printed tape on which desired characters are printed by performing a key operation while holding the housing of the handheld tape writer with one hand.

However, a situation in which the user accidentally presses an undesired key often occurs in such a handheld tape writer. This occurs because the user presses the key with one hand while holing the housing with another hand, or the user presses the key with his/her thumbs while holding the housing with both hands, which occurs since the housing is small. For example, when the print key is pressed by accident, the tape printing is started even though desired characters are not completely input. As a result, the tape is wasted. When the power key is pressed by accident while characters are being input, trouble occurs such that input character data is lost.

In order to avoid such troubles, it is conceivable that an undesired operation due to an accidental key pressing can be prevented by changing a mechanical structure of specific keys, such as the print key and the power key, so that a key contact is not made unless a force is applied to the specific keys which is stronger than a force applied to the other keys. However, implementing this solution complicates the structure of the tape writer since the structure of a few of keys needs to be changed which increases the parts count. Further, a manufacturing process becomes complicated and manufacturing costs increase.

It is also conceivable that the undesired operation can be prevented by making the structure of a specific key such that it cannot be pressed by general operation. For example, the specific key can be enclosed with protrusions, or can be provided with a cover, or only pressing a combination of the specific key and a predetermined key (e.g., the specific key and the predetermined key are simultaneously pressed) results in the tape writer detecting that the specific key has been pressed. However, it is still necessary to change the structure of the housing where the specific key is arranged. Accordingly, the structure of the tape writer becomes complicated and the parts count increases. Further, the manufacturing process becomes complicated and manufacturing costs increase. Furthermore, this structure is subject to the disadvantage that it is difficult for users to press the specific key.

SUMMARY OF THE INVENTION

The invention provides an electronic apparatus having a plurality of keys arranged thereon, wherein an undesired operation is prevented from occurring when a specific key is pressed by accident, and the specific key can be pressed by an user without any troublesome operation. This advantage is achieved without changing the mechanical structure of the specific key.

According to the invention, an undesired operation can be prevented from occurring without changing a mechanical structure of a specific key by which a function that occurs the critical incorrect operations when a key is pressed by accident is set to a first key.

In order to achieve the above object, an electronic apparatus is provided that has a plurality of keys, including a first key and a second key arranged on the electronic apparatus. In the electronic apparatus, a first key minimum pressing time that is required to detect that the first key has been pressed is longer than a second key minimum pressing time that is required to detect that the second key has been pressed. According the structure described above, the length of the first key minimum pressing time is longer than the length of the second key minimum pressing time. Therefore, the pressing of the first key is detected when the first key is pressed for a longer amount of time than the second key. Accordingly, critical incorrect operations can be prevented without changing the mechanical structure of the key by which the function that occurs the critical incorrect operations when the key is pressed by accident is set to the first key.

Further, an electronic apparatus may include a plurality of keys, including a first key and a second key that are arranged in a matrix, and a key scan detector that detects a key has been pressed by scanning the plurality of keys one after another at predetermined scan intervals. In the electronic apparatus, the key scan detector detects that the first key has been pressed if the first key is continuously in a pressed state for at least a first predetermined number of scans. The key scan detector detects that the second key has been pressed if the second key is continuously in the pressed state for at least a second predetermined number of scans which is less than the first predetermined number of scans. According to the structure described above, the first predetermined number of scans is larger in number than the second predetermined number of scans, so that the first key is not detected as having been pressed unless the first key is pressed for a longer amount of time than the second key. Therefore, the critical incorrect operations can be prevented from occurring in the electronic apparatus without changing the mechanical structure of the key by which the function that occurs the critical incorrect operations when the key is pressed by accident is set to the first key.

BRIEF DESCRIPTION OF THE DRAWINGS

Preferred embodiments of the invention will be described in detail with reference to the following figures wherein.

DETAILED DESCRIPTION OF THE PREFERRED EMBODIMENTS

A preferred embodiment of the invention will be described with reference to the drawings.

Figure 1:
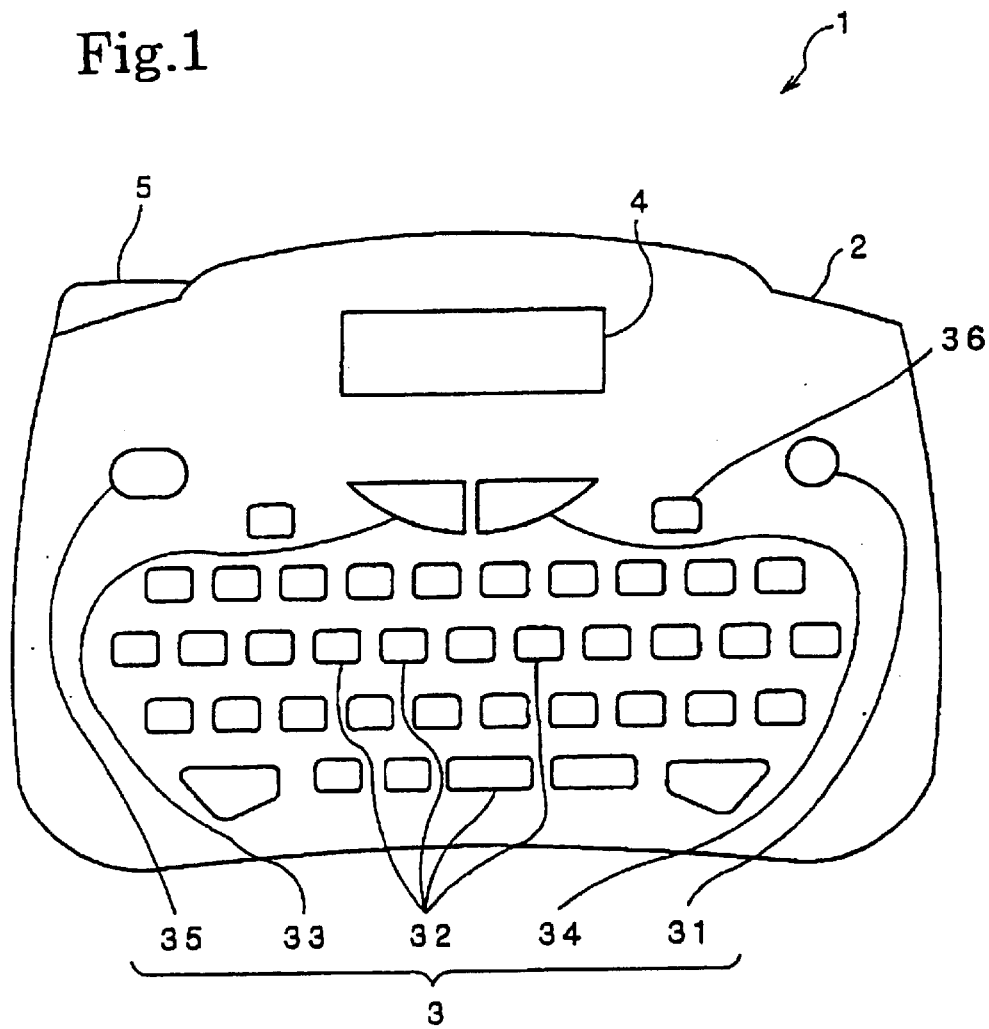
FIG. 1 is a schematic front view of a handheld tape writer of an embodiment of the invention.
Figure 2:
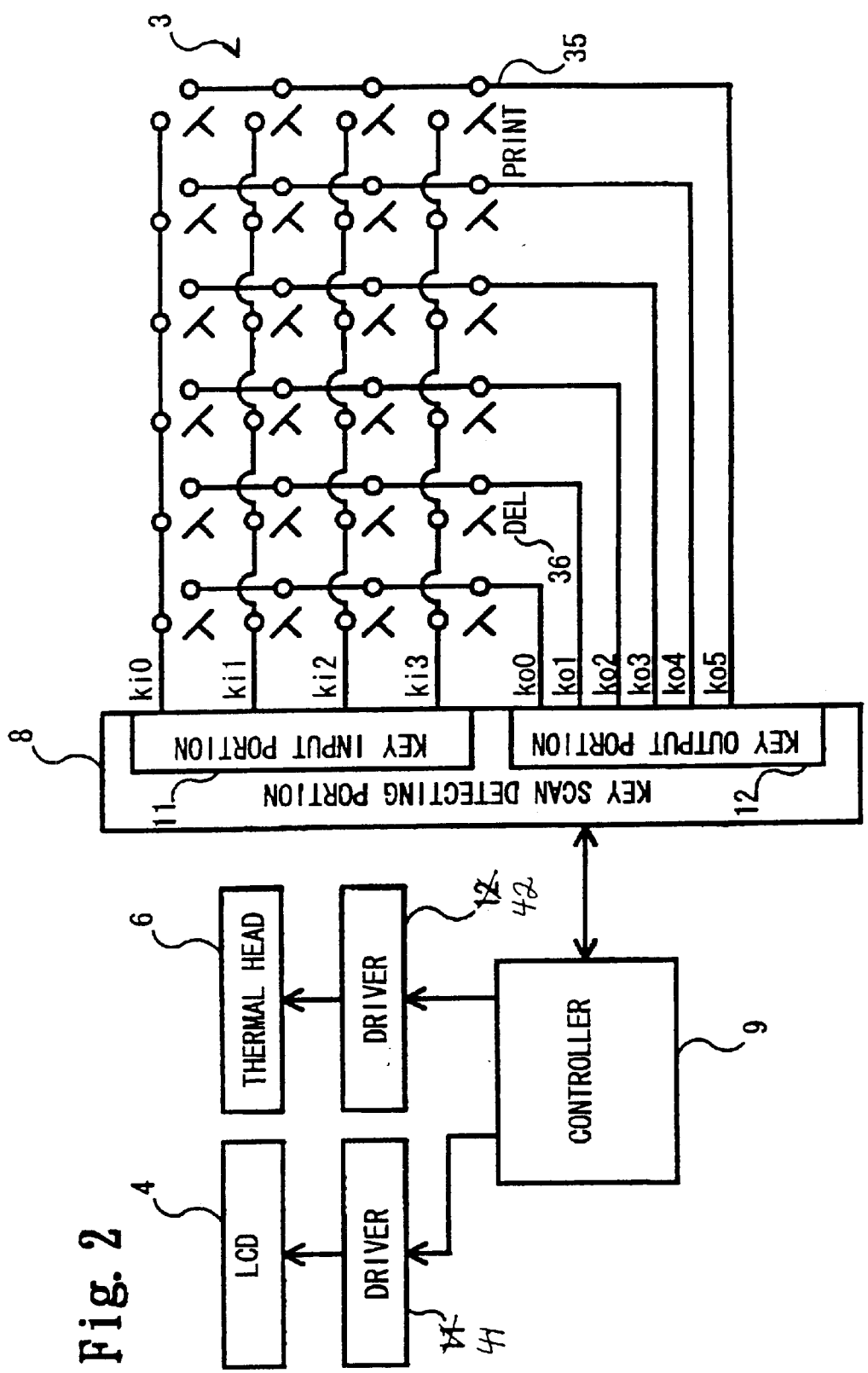
FIG. 2 is a block diagram of a control system of the handheld tape writer shown in FIG. 1.
Figure 3:
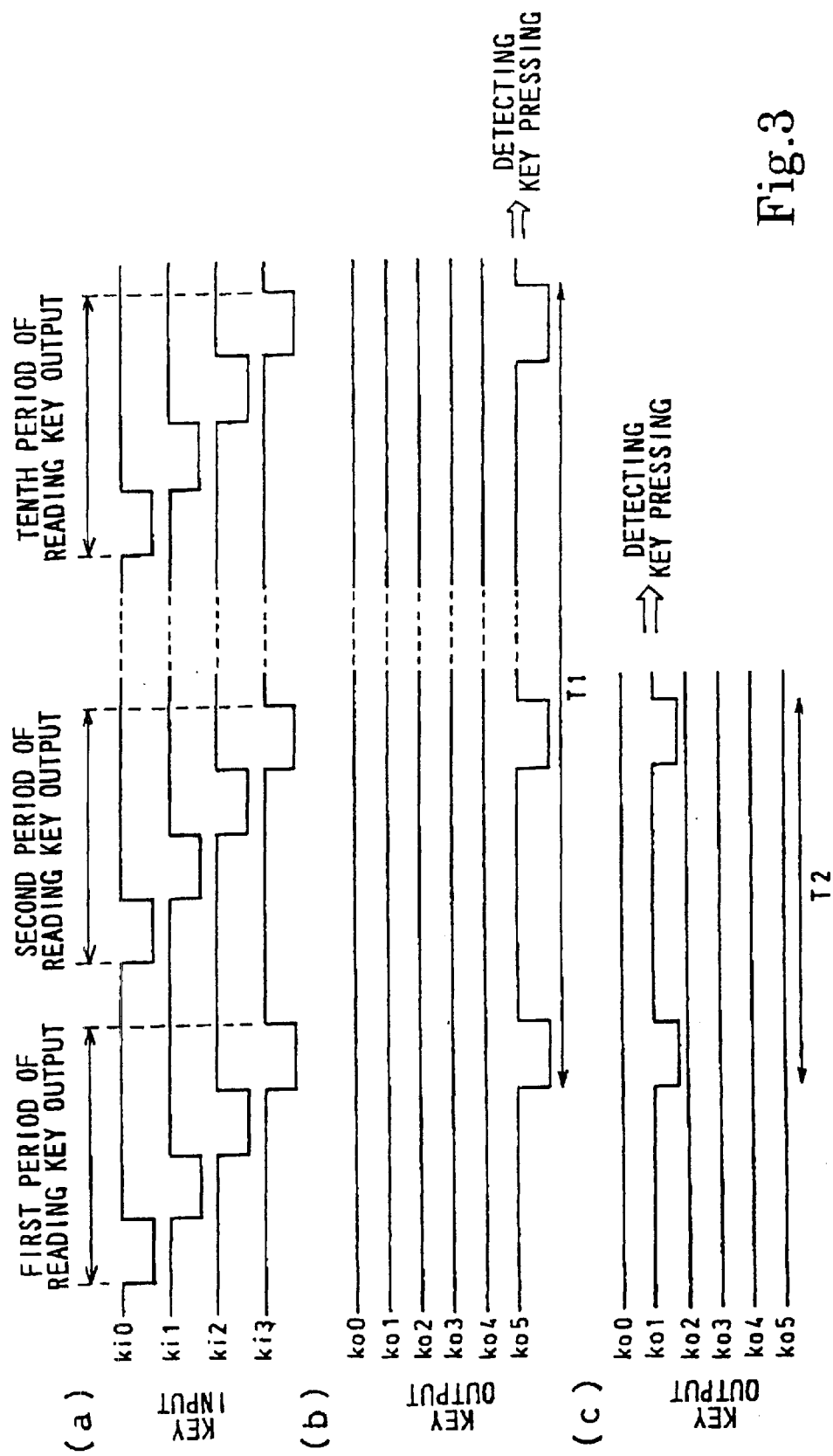
FIG. 3 is a timing chart of a timing of key scan and a timing of reading key output in the handheld tape writer shown in FIG. 1.
Figure 4:
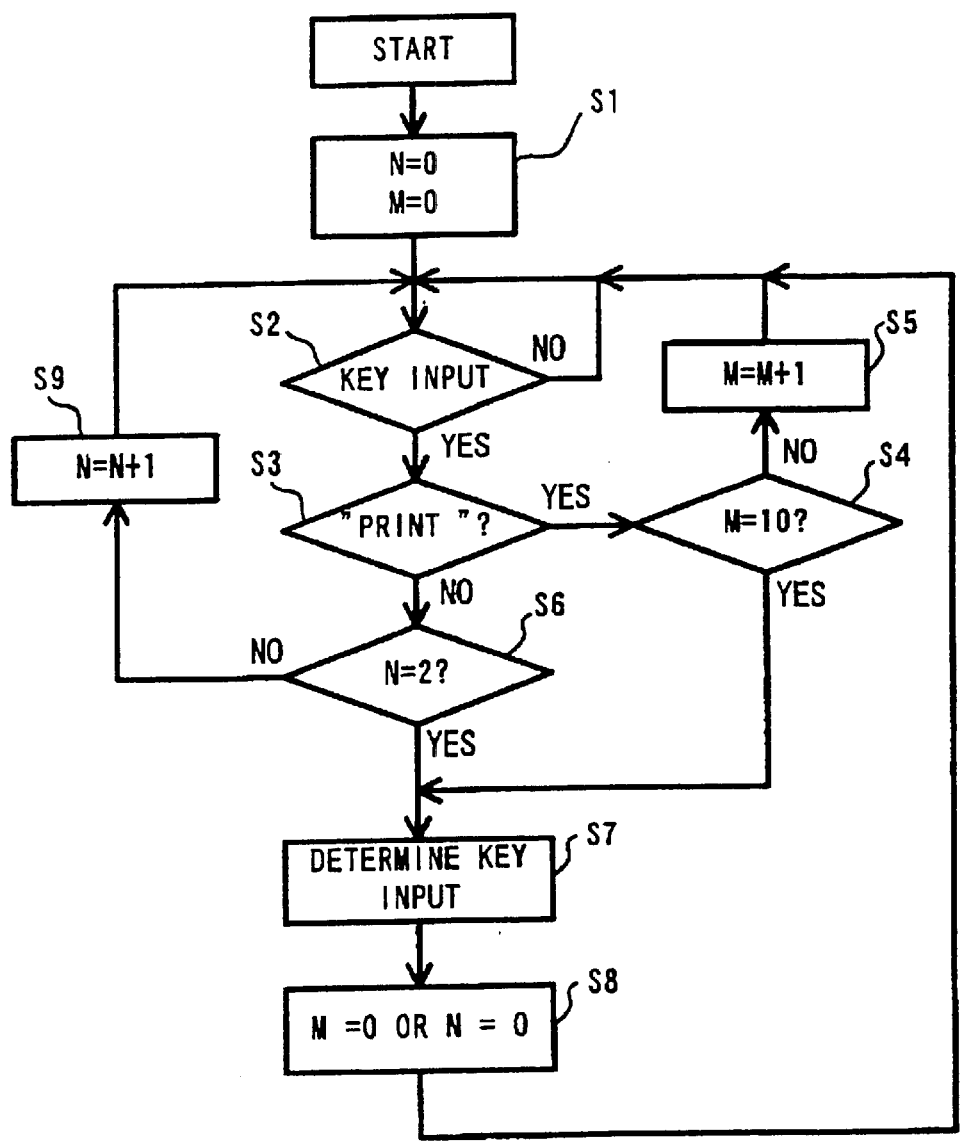
FIG. 4 is a flowchart of key scan detection of the handheld tape writer shown in FIG. 1.
Figure 5:
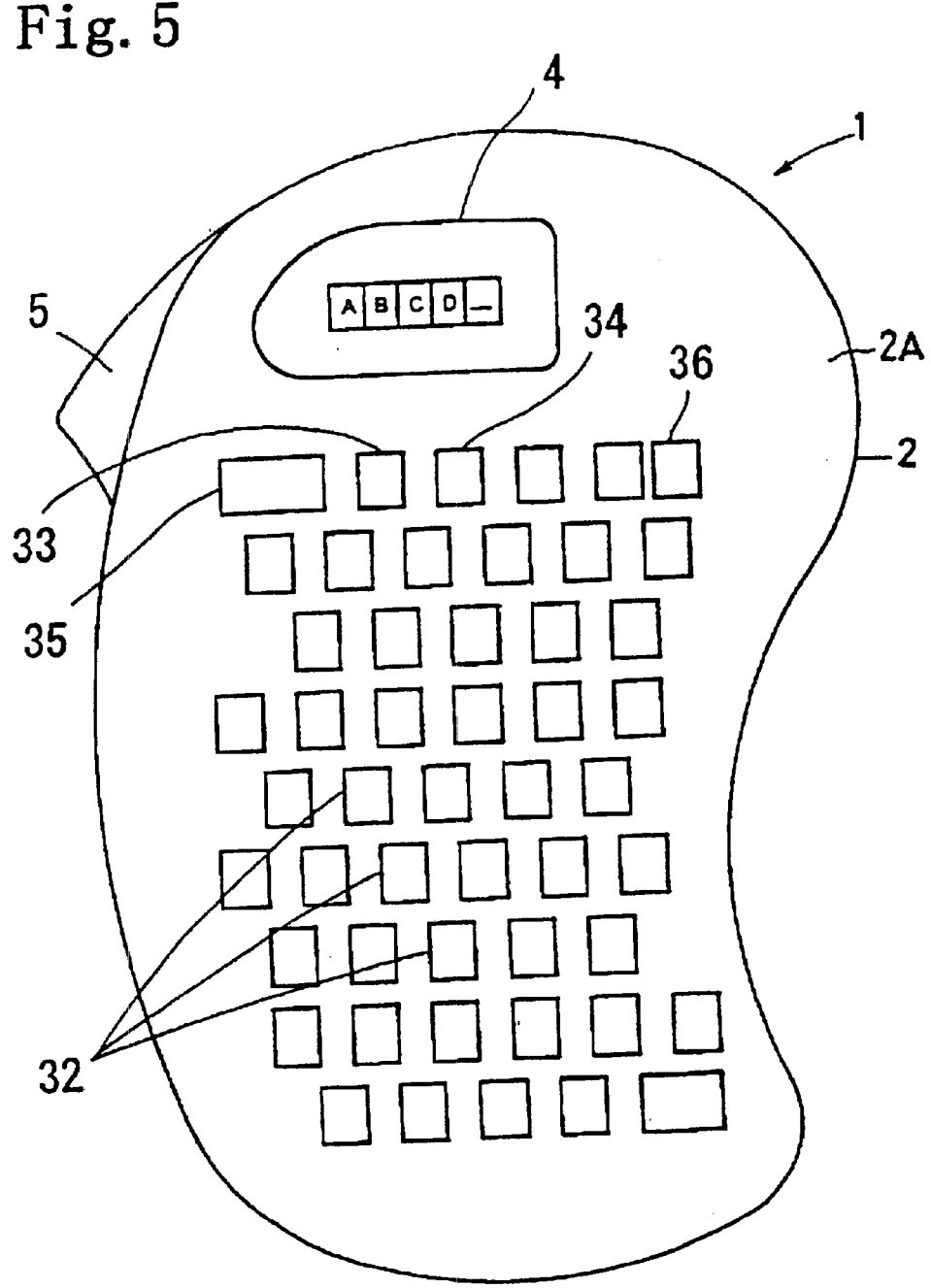
FIG. 5 is a schematic front view of a handheld tape writer of another embodiment of the invention.

The embodiment relates to a handheld tape writer that is an example of an electronic apparatus. FIG. 1 is a schematic front view of the handheld tape writer of the embodiment. FIG. 2 is a block diagram of the handheld tape writer of the embodiment. FIG. 3 is a timing chart of a timing of key scan and a timing of reading key output in the handheld tape writer. FIG. 4 is a flowchart of key scan detection in the handheld tape writer of the embodiment. FIG. 5 is a schematic front view of a handheld tape writer of another embodiment of the invention.

As shown in FIGS. 1 and 5, a plurality of keys 3 are provided on a surface of a housing 2 of a handheld tape writer 1 of the embodiment. The housing 2 is at most almost the same size as both hands of a user that are held open. Therefore, a user can hold the tape writer with one hand or both hands.

There are various kinds of keys 3, such as a power key 31 for turning power of the handheld tape writer 1 on/off, character input keys, 32 including twenty-six alphabet keys, a space key and a delete key 36 (see FIG. 2), a tape feed key 33, a tape take-up key 34, and a print key 35 for starting printing on a tape. In an upper portion of the housing 2, a liquid crystal display (LCD) 4 is provided to display the contents to be printed, which include data input by the character input keys 32 and messages for the user.

Further, a cut button 5 is provided to an upper side of the housing 2 to cut the length of tape, which is a printing medium, at a desired position. When the cut button 5 is pressed, a cutter (not shown) cuts the tape by a pressing force from the cut button 5. In the housing 2, a cassette, in which the long length of tape is wound, is housed. When the print key 35 is pressed, printing is performed on the tape by a thermal head 6 (see FIG. 2) while the tape is fed in a discharge direction by a transport roller (not shown).

When the user operates a small-sized electronic apparatus, such as the handheld tape writer of the embodiment, generally, the user holds a housing of the electronic apparatus with one hand and performs key input with another hand, or the user holds the housing of the electronic apparatus with one hand and performs key input with a finger (mainly a thumb) of the hand holding the housing. Further, the user can hold the right and left sides of the housing of the electronic apparatus with both hands and perform key input with the user's thumbs. In the small-sized electronic apparatus, the size of the keys is inevitably limited to be small and a plurality of keys are arranged on the housing without much space between adjacent keys due to the size of the housing. Accordingly, the user can easily press an undesired key which is due to a peculiarity of the user's operating method and the special limitations of the key arrangement.

In particular, keys that are provided on the housing locations described below are often pressed by accident. A key provided at a portion of the housing to be held or supported, or near the portion of the housing to be held or supported. A key provided at a portion of the housing near a thumb of a hand holding the housing. A key provided near an outer edge of the housing. These keys may be accidentally pressed without the user being aware of it when the housing is held by the user, or these keys may be unnecessarily touched when the key positioned around the middle portion of the housing is pressed.

Next, referring to FIG. 2, a control system of the handheld tape writer 1 of the embodiment will be described. As shown in FIG. 2, the keys 3 are arranged in a matrix in the embodiment. That is, each key 3 is placed at the intersection of four input signal lines ki0 to ki3 and six output signal lines ko0 to ko5. When the key 3 is pressed, the vertical and lateral signal lines of the intersection are connected, so that a key pressing is detected. In FIG. 2, a key matrix with 4 rows and 6 columns is shown. In fact, it is possible to structure a key matrix with n rows and m columns (n and m are any natural numbers).

The keys 3 are successively scanned at specified scan intervals by a key scan detector 8. The key scan detector 8 includes a key input portion 11 that sends out-of-phase pulses to the four input signal lines ki0 to ki3, and a key output portion 12 that detects the pressing of the key 3 by receiving signals from the six output signal lines ko0 to ko5.

The key scan detector 8 is connected to a controller 9. A key pressing detection signal is sent to the controller 9 from the key output portion 12 in the key scan detector 8. The controller 9 includes a CPU, a ROM, and a RAM. The controller 9 is connected to the LCD 4 and the thermal head 6 via drivers 41, 42. When the CPU receives the key pressing detection signal from the key output portion 12, the CPU performs a predetermined operation based on programs and data stored in the ROM, and data stored in the RAM, if necessary. Then, the CPU writes the data into the RAM according to the result and gives a command to the drivers 41, 42.

For example, when the key pressing detection signal of the alphabet key of the character input keys 32 is sent to the controller 9, character code data corresponding to the pressed key is stored in an input buffer of the RAM and the CPU gives a display command to the driver 41 based on the contents stored in the input buffer and font data stored in the ROM. Accordingly, the input character is displayed on the LCD 4 by a drive signal from the driver 41. When the key pressing detection signal of the print key 35 is sent to the controller 9, the CPU gives a printing command to the driver 42 based on the character data stored in the input buffer in the RAM and the font data stored in the ROM corresponding to the character data. Therefore, the characters are printed on the tape by driving the thermal head based on drive signals from the driver 42. In FIG. 2, a tape transport motor and the like are omitted from the drawing.

Next, a key pressing detecting operation of the tape writer 1 of the embodiment will be described. As shown in FIG. 3(a), the four out-of-phase voltage pulses do not overlap their period when the pulse is asserted (active is shown as a low signal in the embodiment) are successively sent to each input signal line ki0 to ki3. A period of the pulse to be input (key scan period) is, for example, around 10 m per second. On the other hand, the key output portion 12 always detects a voltage level of each output signal lines ko0 to ko5. When the keys 3 are free from pressure and a key contact is not made (an unpressed state), the six output signal lines ko0 to ko5 remain nonactive (nonactive is shown as a high signal in the embodiment).

When the key 3 is pressed and the key contact is made (a pressed state), the output signal lines ko0 to ko5 passing the key contact become low in synchronization with the input signal lines ki0 to ki3 passing the key contact that become low. Therefore, it is possible to know which key contact is made by comparing the timings between the input pulse sent from the key input portion 11 and output pulse detected at the key output portion 12.

FIG. 3(b) is a diagram for explaining the key pressing detection when the print key 35 is pressed according to the embodiment. FIG. 3(c) is a diagram for explaining the key pressing detection when the key other than the print key is pressed (Here, the delete key 36 is taken as an example. However, all of the keys may be structured so as to operate in the same manner as the delete key 36, except for the print key 35. In the embodiment, the print key 35 is provided at the intersection of the input signal line ki3 and the output signal line ko5. The delete key 36 is provided at the intersection of the input signal line ki3 and the output signal line ko1.

As shown in FIG. 3(b), the pressing of the print key 35 is detected at the key output portion 12 when the key contact is being continuously made for ten periods in the key scan period. On the other hand, as shown in FIG. 3(c), the pressing of the delete key 36 is detected at the key output portion 12 when the key contact is being continuously made for two periods in the key scan period. In order to prevent an incorrect detection due to chattering, it is preferred that a condition of the key pressing detection be made such that the predetermined number of times that the key contact is not continuously made is detected after the predetermined number of times that the key contact is continuously made is detected.

That is, in the tape writer 1 of the embodiment, in order to detect the pressing of the print key 35 when the print key 35 is pressed, it is required that the key contact of the print key 35 be made for at least a period of time T1 (nine to ten times' as long as the key scan period). In order to detect the pressing of the delete key 36 when the delete key 36 is pressed, it is required that the key contact of the delete key 36 be made for at least a period of time T2 (one to twice as long as the key scan period).

A general operation of the key pressing detection will be further described with reference to FIG. 4. First, when power of the tape writer 1 is turned on, parameters N and M are initialized to 0 at step S1. The parameter N is the number of times that the key contacts are made of the keys other than the print key 35. The parameter M is the number of times that the key contact of the print key 35 is made.

Next, at step S2, it is repeatedly determined whether key input is performed, that is, whether the key contact is made, based on the comparison of levels between the input signal lines ki0 to ki3 and the output signal lines ko0 to ko5 (S2:NO). When it is determined that key input has been performed (S2:YES), flow proceeds to step S3. At step S3, it is determined whether the key input is performed by the print key 35 based on the comparison of levels between the input signal lines and the output signal lines.

When the key input is performed by the print key 35 and the corresponding key contact is made (S3:YES), flow proceeds to step S4. At step S4, it is determined whether the parameter M is 10. When the parameter M is not 10 (S4:NO), flow returns to step S2 after the parameter M is incremented by one at step S5. As described above, the parameter M is incremented by one every key scan. When the parameter M becomes 10 (S4:YES), flow proceeds to step S7. At step S7, the detection signal indicating that the print key 25 has been pressed is output to the controller 9. At step S8, only the parameter M is initialized to 0 and then flow returns to step S2.

On the other hand, when the key input is performed by a key other than the print key 35 and the corresponding key contact is made (S3:NO), flow proceeds to step S6. At step S6, it is determined whether the parameter N is 2. When the parameter N is not 2 (S6:NO), flow returns to step S2 after the parameter N is incremented by one at step S9. As described above, the parameter N is incremented by one every key scan. When the parameter N becomes 2 (S6:YES), flow proceeds to step S7. At step S7, the detection signal indicating that the key has been pressed is output to the controller 9. At step S8, only the parameter N is initialized to 0 and then flow returns to step S2. The parameters M and N are also initialized after the expiration of a predetermined time interval after the last corresponding key is pressed. Therefore, the parameters will not be cumulatively added when the key is pressed on another occasion after some time passes.

As described above, in the tape writer 1 of the embodiment, a minimum pressing time of the print key that is required to detect that the print key 35 has been pressed is longer than a minimum pressing time of a general key, other than the print key 35, that is required to detect that the general key has been pressed. Therefore, when the minimum pressing time of the print key is appropriately controlled, the pressing of the print key 35 is not detected even when the print key 35 is pressed for a short amount of time by accident. Accordingly, even when the print key 35 is pressed by accident, the probability becomes low that the tape printing will be performed based upon a detection that the print key 35 has been pressed. As a result, wasted use of tape due to accidental key pressing can be minimized.

Further, the mechanical structure of the print key 35 need not be changed. That is, it is no problem that the print key 35 has the same structure as other keys. Therefore, the parts count is not increased and the structure of the tape writer 1 does not become complicated. Accordingly, the tape writer 1 can be easily manufactured at low cost.

While the preferred embodiment of the invention has been described, it would be apparent to those skilled in the art that various design changes may be made therein without departing from the spirit of the invention. For example, the minimum pressing time of the power key 31 may be set to be as long as the print key 35. Thereby, halfway input data can be prevented from being lost.

Further, in the tape writer that cuts the tape using the cutter that is electrically driven by pressing a tape cut key, but not by the pressing force from the cut button 5, the minimum pressing time of the tape cut key may be set to be longer than that of other keys. Thereby, the tape can be prevented from being wasted even when the tape cut key is pressed by accident.

Further, the minimum pressing time of the delete key 36 may be set to be longer than that of the character input keys of alphabet keys. By doing so, input character data can be prevented from being lost. Furthermore, it is preferred to set the minimum pressing time of a key that performs a special function (a function key), such as the tape feed key 33 and the tape take-up key 34, to be longer than that of other keys. By doing so, undesired operation can be prevented from occurring and also a breakdown of the tape writer that occurs because of the undesired operation can be prevented.

Further, the minimum pressing time does not have to be increased for only keys that perform the special functions that are described above. For example, the minimum pressing time can be increased for character input keys 32 that are provided at positions which are easily pressed by accident. Keys that are easily accidentally pressed include, for example, a key provided at a portion of the housing where the user tends to hold the housing or where a thumb touches, particularly, at the base of the housing, and a key provided on the outer edge side of the housing.

In addition to the setting of the minimum pressing time of the specific key, it is possible to reduce the occurrence of the undesired operations in the tape writer caused by accidental key pressing by changing the key arrangement. To be more specific, the aforementioned specific keys (such as the print key 35, the power key 31, and the tape cut key 5) can be provided at an upper part of the housing relative to where the character input key 32 are provided, or can be provided on an opposite side from the character keys 2. For example, the character input keys 32 can be provided on the front of the housing 2 and the specific keys can be provided on the back or side of the housing 2. If such a key arrangement is applied to the tape writer, the character input key 32 and the specific keys are provided in different areas. Therefore, the possibility of accidentally pressing an undesired key is decreased.

The user may hold the tape writer 1 with his/her hand/hands (i.e., either with one hand or both hands) and perform a key operation using the fingers of the hand/hands holding the tape writer 1. In particular, in the tape writer 1 to be used in the case described above, the specific keys, which are desired to be not pressed by accident, are preferably provided at a position away from a finger so that the finger operating the character keys 32 cannot reach the specific keys while holding the housing 2.

In the aforementioned embodiment, it is assumed that the minimum key pressing time is set in advance in the specifications of the device. However, the tape writer may be structured so that the minimum pressing time of each key can be changed/set by the user. If the tape writer has the structure described above, the minimum key pressing time can be set according to user's habit and sense. Accordingly, the usability of the tape writer can be improved.

The embodiment described above relates to an apparatus having a plurality of keys that are arranged in a matrix and that are scanned one after another. However, the invention is not restricted to such an apparatus. The invention can be applied to apparatuses that have a plurality of keys. In the aforementioned embodiment, the tape writer has been described as an example. However, the invention can be applied to electronic apparatuses in general having a plurality of keys other than tape writers, such as word processors, cellular phones, mobile computers, and PDAs.

What is claimed is:

1. An electronic apparatus, comprising:
    a plurality of keys including a first key and a second key that are arranged on the apparatus; and
    a device that sets a first key minimum pressing time that is required to detect that the first key has been pressed to be longer than a second key minimum pressing time that is required to detect that the second key has been pressed.

2. The electronic apparatus according to claim 1, further including a housing capable of being held with at least one of one hand and both hands of a user.

3. The electronic apparatus according to claim 2, wherein the first key is provided at a location on the housing that is near where the housing is held by a user.

4. The electronic apparatus according to claim 3, wherein the first key is disposed at an area of the housing that is contacted by a thumb of the user when the user holds the housing.

5. The electronic apparatus according to claim 2, wherein the first key is disposed at a location that is closer to an outer edge of the housing than the second key.

6. The electronic apparatus according to claim 2, wherein the first key is disposed on at least one of a back and a side of the housing, and the second key is disposed on a front of the housing.

7. The electronic apparatus according to claim 2, the first key is disposed at an upper part of the housing, and the second key is not disposed at the upper part of the housing.

8. The electronic apparatus according to claim 1, wherein the first key is an execution key.

9. The electronic apparatus according to claim 1, wherein the first key is a power switch.

10. The electronic apparatus according to claim 1, wherein the first key is a delete key.

11. The electronic apparatus according to claim 1, wherein the first key is a function key.

12. An electronic apparatus, comprising;
    a plurality of keys including a first key and a second key arranged in a matrix; and
    a key scan detector that detects a key pressing by scanning the plurality of keys one after another at predetermined scan intervals;
    wherein the key scan detector detects that the first key has been pressed if the first key is continuously in a pressed state for at least a first predetermined number of scans, and detects that the second key has been pressed if the second key is continuously in the pressed state for at least a second predetermined number of scans, the second predetermined number of scans being less than the first predetermined number of scans.

13. The electronic apparatus according to claim 12, further including a housing capable of being held with at least one of one hand and both hands of a user.

14. The electronic apparatus according to claim 13, wherein the first key is provided at a location on the housing that is near where the housing is held by the user.

15. The electronic apparatus according to claim 14, wherein the first key is disposed within an area where a thumb touches when the housing is held.

16. The electronic apparatus according to claim 13, wherein the first key is disposed near an outer edge of the housing.

17. The electronic apparatus according to claim 13, wherein the first key is disposed on at least one of a back and a side of the housing, and the second key is disposed on a front of the housing.

18. The electronic apparatus according to claim 13, the first key is disposed at an upper part of the housing, and the second key is not disposed at the upper part of the housing.

19. The electronic apparatus according to claim 12, wherein the first key is an execution key.

20. The electronic apparatus according to claim 12, wherein the first key is a power switch.

21. The electronic apparatus according to claim 12, wherein the first key is a delete key.

22. The electronic apparatus according to claim 12, wherein the first key is a function key.

* * * * *